United States Patent Office 2,886,604
Patented May 12, 1959

2,886,604

PREPARATION OF COMPOUNDS HAVING A BENZYLBENZYL HALIDE STRUCTURE

Louis Schmerling, Riverside, Ill., assignor, by mesne assignments, to Universal Oil Products Company, Des Plaines, Ill., a corporation of Delaware No Drawing. Application October 7, 1953
Serial No. 384,769

13 Claims. (Cl. 260—649)

This invention relates to a method for the preparation of compounds having a benzylbenzyl halide structure and particularly to a method for preparing benzylbenzyl chloride.

An object of this invention is to provide a method of preparing novel compositions of matter comprising compounds having a benzylbenzyl halide structure.

A further object of this invention is to provide a method for preparing novel compositions of matter comprising benzylbenzyl halides by treating benzyl halides with acid catalysts.

In one embodiment, this invention relates to a process for the preparation of compounds having a benzylbenzyl halide structure by treating an aralkyl halide with an acid catalyst at a temperature such that a hydrogen halide is evolved.

A further embodiment of this invention resides in a process for the preparation of a compound having a benzylbenzyl halide structure by treating a benzyl halide with an acid catalyst such as sulfuric acid at a temperature such that a hydrogen halide is evolved, in the presence of an organic compound capable of combining with said evolved hydrogen halide.

A specific embodiment of this invention is found in a process for preparing a compound having a benzylbenzyl halide structure by treating a benzyl halide such as benzyl chloride with an acid catalyst such as sulfuric acid at a temperature such that hydrogen halide is evolved.

A more specific embodiment of this invention is found in a process for the preparation of benzylbenzyl chloride by treating benzyl chloride with sulfuric acid at a temperature within the range of from about −20° C. to about +50° C. such that hydrogen chloride is evolved.

The other objects and embodiments of this invention referring to alternative benzyl halides and to alternative acid catalysts will be referred to in greater detail in the following further detailed description of the invention.

It has now been discovered that new compositions of matter namely, compounds having a benzylbenzyl halide structure may be prepared by treating a benzyl halide with an acid catalyst at temperatures such that a hydrogen halide is evolved. The benzylbenzyl halides so prepared are useful for preparing polymeric products such as resins and plastics as well as intermediates in producing detergents or wetting agents.

The benzyl halide compounds used in the process of the present invention have the general formula:

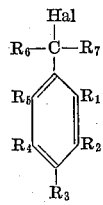

in which the R's are hydrogen, alkyl or aryl substituents, at least one R, preferably $R_3$, being hydrogen and Hal=a halogen, preferably chlorine or bromine. It is also contemplated within the scope of this invention that some of the R's may comprise cyclic hydrocarbons such as tetralin, naphthalene, etc. In some instances it is possible that mixed benzyl halide such as benzyl chloride and benzyl bromide may be condensed to form compounds having a benzylbenzyl halide structure, one of the halogens splitting off along with a hydrogen to form the hydrogen halide which is evolved. Polynuclear aromatic halides such as chloromethylnaphthalene, bromomethylnaphthalene, etc. may also be condensed by treating said compounds with an acid catalyst at temperatures such that a hydrogen halide will be evolved. Examples of benzyl halides and substituted benzyl halides include benzyl chloride, benzyl bromide, 2-methylbenzyl chloride, 3-ethylbenzyl chloride, 4-isopropylbenzyl chloride, 2-methylbenzyl bromide, 3-methylbenzyl bromide, 2-propylbenzyl bromide, etc., α-methylbenzyl chloride, α,α-dimethylbenzyl chloride, α,α-2-trimethylbenzyl chloride, α-methylbenzyl bromide, α,α-dimethylbenzyl bromide, etc., α,α-diethylbenzyl chloride, 2-ethyl benzyl chloride, etc., α-methyl-2-ethylbenzyl chloride, α-ethyl-3-propylbenzyl chloride, α,α-dimethyl-2-ethylbenzyl chloride, α,α-dimethyl-2-ethylbenzyl bromide, etc., 2-phenylbenzyl chloride, 4-phenylbenzyl chloride, α-methyl-3-phenylbenzyl chloride, 2-chloromethylnaphthalene, 1-chloromethyl-5,6,7,8-tetrahydronaphthalene, etc.

As hereinbefore set forth a benzyl halide such as benzyl chloride, or a nuclearly alkylated alkylbenzyl halide such as 2-methylbenzyl chloride, or a nuclearly arylated arylbenzyl halide such as 2-phenylbenzyl chloride, or a side chain alkylated or arylated benzyl halide such as α-methyl benzyl chloride (i.e., α-chloroethylbenzene) or α-phenylbenzyl chloride, or other types of benzyl halides, either pure or in admixture with another benzyl halide is treated with an acid catalyst such as sulfuric acid, hydrogen fluoride, phosphoric acid, etc., at suitable reaction temperatures such that hydrogen halide is evolved. The temperature under which the process of the present invention will proceed is dependent upon the type of catalyst used in said process. For example, when active catalysts such as sulfuric acid or hydrogen fluoride are used, the temperature of the reaction will range from about −20° C. to about +50° C. or more; with less active catalysts such as phosphoric acid, the temperature range will be higher and will range from about 20° C. to about 200° C. or more. In addition, although it is not a necessary factor in the process of the present invention, it may be useful to have a substance present in the reaction mixture which may be capable of combining with the hydrogen halide evolved from the reaction. For example, the reaction may be carried out in the presence of compounds such as vinyl chloride, allyl chloride, vinyl bromide, allyl bromide, methylallyl chloride, methylallyl bromide, etc. For instance, if methallyl chloride is used, there is obtained as a by-product, 1,2-dichloro-2-methylpropane.

The reaction is usually carried out at atmospheric pressure, but superatmospheric pressures may be employed if desired.

Long chain alkyl benzylbenzyl halides may be converted to useful detergents or wetting agents, examples of this type of detergent or wetting agent being dodecylbenzylbenzyl trimethyl ammonium hydroxides, sodium dodecylbenzylbenzylsulfonic acid, sodium dodecylbenzylphenylacetate, etc. The long chain alkyl benzylbenzyl halides may be formed by treating an alkylbenzyl halide either pure or in admixture with benzyl chloride or benzyl bromide in the presence of acid catalysts. For example, dodecylbenzene may be chloromethylated to yield 4-dodecylbenzyl chloride which on treatment with benzyl chloride and an acid catalyst such as sulfuric acid forms 4-(4-dodecylbenzyl) benzyl chloride. This latter compound may then be converted into the hereinbefore mentioned detergents or wetting agents.

The process of the present invention may be carried out in any suitable manner, and may be either a batch or continuous type of operation. When a batch type of operation is used, a quantity of the starting materials, namely, the benzyl halide and the acid catalyst are placed in a reaction vessel equipped with a mixing device. The temperature of the reaction vessel is maintained at the desired reaction temperature and the catalyst and benzyl halide compound are then stirred for a predetermined length of time, after which the vessel and contents thereof are allowed to come to room temperature and the desired product, comprising a benzylbenzyl halide compound, is separated from the unreacted starting materials by conventional means, for example, by separation and fractional distillation.

Another method of operation of the present process is of the continuous type. In this process the benzyl halide compound is led into a reaction vessel which is maintained at suitable operating conditions. The acid catalyst which is to be used to treat the benzyl halide is led in through separate means. The reaction zone may be unpacked vessel or coil, or it may contain an adsorbent packing material such as firebrick, alumina, dehydrated bauxite and the like. The reaction product is separated from the reactor effluent, and the unconverted material may be recycled to the reaction zone to form the portion of the starting materials.

The following examples are given to illustrate the process of the present invention which, however, are not intended to limit the generally broad scope of the present invention therewith.

*Example I*

A mixture of 103 grams of benzyl chloride and 52 grams of 96% sulfuric acid was stirred at 0° C. for a period of approximately 5 hours. During this time it was noted that hydrogen chloride was evolved from the reaction mixture. At the end of the five hours the upper layer was separated from the dark brown catalyst layer, washed with water and alkali, dried and subjected to fractional distillation. 16 grams of 4-benzylbenzyl chloride, boiling at 138–140° C. at about 2 mm. pressure, were obtained by this fractional distillation.

*Example II*

A solution of 100 grams of benzyl chloride was dissolved in 50 grams of n-pentane. This solution was stirred with 50 grams of 96% sulfuric acid at a temperature of about 0° C. while 52 grams of methallyl chloride dissolved in 52 grams of n-pentane were slowly added to the benzyl chloride-sulfuric acid mixture. The addition of the methallyl chloride took about 3 hours before the entire amount had been added, the temperature being kept at 2–4° C. during the addition. The mixture was stirred for an additional 2 hours, after which the upper layer was separated from the catalyst layer, was washed, dried and subjected to fractional distillation. 40 grams of 1,2-dichloro-2-methyl propane which was formed by the addition of the evolved hydrogen chloride to the methallyl chloride and 30 grams of 4-benzylbenzyl chloride boiling at 152–154° C. at about 2 mm. were obtained from this distillation.

Redistillation of the combined product from Examples I and II showed that the benzylbenzyl chloride boils chiefly at 154–155° C. at 5.4 mm. (319.5–321° C. at 760 mm.) and has an $n_D^{20}=1.5920$. The analysis of the benzylbenzyl chloride resulted in the following figures.

*Analysis.*—Calculated for $C_6H_5CH_2C_6H_4CH_2Cl$: C, 77.59; H, 6.05; Cl, 16.36. Found: C, 77.57; H, 6.22; Cl, 16.40.

The benzylbenzyl chloride was converted to a clear hard resin when refluxed at atmospheric pressure.

Oxidation of a sample of the benzylbenzyl chloride with aqueous potassium permanganate at 99° C. yielded an acid melting at 147–150° C., indicating that the acid was 4-benzylbenzoic acid. The benzylbenzyl chloride was therefore 4-benzylbenzyl chloride.

I claim as my invention:

1. A process for the preparation of a compound having a benzylbenzyl halide structure which comprises treating a benzyl halide consisting of carbon, hydrogen and a halogen selected from the group consisting of chlorine and bromine with sulfuric acid at a temperature of from about −20° C. to about 50° C. such that a hydrogen halide is evolved.

2. A process for the preparation of a compound having a benzylbenzyl halide structure which comprises treating a benzyl halide consisting of carbon, hydrogen and a halogen selected from the group consisting of chlorine and bromine with hydrogen fluoride at a temperature of from about −20° C. to about 50° C. such that a hydrogen halide is evolved.

3. A process for the preparation of a compound having a benzylbenzyl halide structure which comprises treating a benzyl halide consisting of carbon, hydrogen and a halogen selected from the group consisting of chlorine and bromine with phosphoric acid at a temperature of from about −20° C. to about 200° C. such that a hydrogen halide is evolved.

4. A process for the preparation of a compound having a benzylbenzyl halide structure which comprises treating a substituted benzyl halide consisting of carbon, hydrogen and a halogen selected from the group consisting of chlorine and bromine with a mineral acid catalyst selected from the group consisting of sulfuric acid, phosphoric acid and hydrogen fluoride at a temperature of from about −20° C. to about 200° C. such that a hydrogen halide is evolved.

5. A process for the preparation of a substituted compound having a benzylbenzyl halide consisting of carbon, hydrogen and a halogen selected from the group consisting of chlorine and bromine structure which comprises treating a substituted benzyl halide with a mineral acid catalyst selected from the group consisting of sulfuric acid, phosphoric acid and hydrogen fluoride at a temperature of from about −20° C. to about 200° C. such that a hydrogen halide is evolved, in the presence of an organic compound capable of combining with said evolved hydrogen halide.

6. A process for the preparation of benzylbenzyl chloride which comprises treating benzyl chloride with a mineral acid catalyst selected from the group consisting of sulfuric acid, phosphoric acid and hydrogen fluoride at a temperature of from about −20° C. to about 200° C. such that a hydrogen chloride is evolved.

7. A process for the preparation of benzylbenzyl bromide which comprises treating benzyl bromide with a mineral acid catalyst selected from the group consisting of sulfuric acid, phosphoric acid and hydrogen fluoride at a temperature of from about −20° C. to about 200° C. such that hydrogen bromide is evolved.

8. A process for the preparation of benzylbenzyl chloride which comprises treating benzyl chloride with a mineral acid catalyst selected from the group consisting of sulfuric acid, phosphoric acid and hydrogen fluoride at a temperature of from about −20° C. to about 200° C. such that hydrogen chloride is evolved, in the presence of methallyl chloride which is capable of combining with said evolved hydrogen chloride.

9. A process for the preparation of benzylbenzyl chloride which comprises treating benzyl chloride with a sulfuric acid catalyst at a temperature within the range of from about −20° C. to about +50° C.

10. A process for the preparation of benzylbenzyl chloride which comprises treating benzyl chloride with a sulfuric acid catalyst at a temperature within the range of from about 0° C. to about 10° C.

11. A process for the preparation of benzylbenzyl chloride which comprises treating benzyl chloride with sulfuric acid at a temperature of about 0° C. in the presence of methallyl chloride.

12. A process for the preparation of a compound having a benzylbenzyl halide structure which comprises treating a benzyl halide consisting of carbon, hydrogen and a halogen selected from the group consisting of chlorine and bromine with an acid selected from the group consisting of sulfuric acid, phosphoric acid and hydrogen fluoride at a temperature of from about −20° C. to about 200° C. such that a hydrogen halide is evolved.

13. A process for the preparation of a compound having a benzylbenzyl halide structure which comprises treating a benzyl halide consisting of carbon, hydrogen and a halogen selected from the group consisting of chlorine and bromine with an acid selected from the group consisting of sulfuric acid, phosphoric acid and hydrogen fluoride at a temperature of from about −20° C. to about 200° C. such that a hydrogen halide is evolved, in the presence of an organic compound capable of combining with the evolved hydrogen halide.

References Cited in the file of this patent

UNITED STATES PATENTS

| | | |
|---|---|---|
| 2,012,302 | Clark et al. | Aug. 27, 1935 |
| 2,556,880 | Lowey | June 12, 1951 |

OTHER REFERENCES

Ingold et al.: "Jour. Chem. Soc." (1928), pages 2249–2262.

Huntress: "Organic Chlorine Compounds," pp. 1160–2 (1948).